(12) United States Patent
Gerst et al.

(10) Patent No.: US 8,302,864 B2
(45) Date of Patent: Nov. 6, 2012

(54) METHOD AND APPARATUS USING AIMING PATTERN FOR MACHINE VISION TRAINING

(75) Inventors: Carl W. Gerst, Clifton Park, NY (US); David Schatz, Needham, MA (US)

(73) Assignee: Cognex Corporation, Natick, MA (US)

( * ) Notice: Subject to any disclaimer, the term of this patent is extended or adjusted under 35 U.S.C. 154(b) by 335 days.

(21) Appl. No.: 11/965,950

(22) Filed: Dec. 28, 2007

(65) Prior Publication Data

US 2009/0166424 A1    Jul. 2, 2009

(51) Int. Cl.
*G06K 7/10* (2006.01)
(52) U.S. Cl. ......... 235/462.02; 235/462.01; 235/462.14; 235/462.2; 235/462.21; 235/462.45; 235/472.01
(58) Field of Classification Search ................... 235/454, 235/462.01–473, 462.11, 462.14, 462.2, 235/462.24, 462.32, 462.45, 472.01–472.03, 235/462.43
See application file for complete search history.

(56) References Cited

U.S. PATENT DOCUMENTS

| | | |
|---|---|---|
| 3,940,777 A | 2/1976 | Komine |
| 4,072,396 A | 2/1978 | Ross |
| 4,160,590 A | 7/1979 | Reynard |
| 4,314,752 A | 2/1982 | Ishizaka et al. |
| 4,478,491 A | 10/1984 | Kawai |
| 4,490,018 A | 12/1984 | Yokotsuka |
| 4,494,828 A | 1/1985 | Masumoto et al. |
| 4,591,253 A | 5/1986 | Hecker et al. |
| 4,871,238 A | 10/1989 | Sato et al. |
| 4,877,949 A | 10/1989 | Danielson et al. |
| 5,019,699 A | 5/1991 | Koenck |
| 5,155,343 A | 10/1992 | Chandler |
| 5,247,152 A | 9/1993 | Blankenship |
| 5,308,966 A | 5/1994 | Danielson et al. |
| 5,313,053 A | 5/1994 | Koenck |
| 5,331,176 A | 7/1994 | Sant'Anselmo et al. |
| 5,331,178 A | 7/1994 | Fukuda et al. |
| 5,349,172 A | 9/1994 | Roustaei |
| 5,365,597 A | 11/1994 | Holeva |
| 5,378,883 A | 1/1995 | Batterman et al. |

(Continued)

FOREIGN PATENT DOCUMENTS

| | | |
|---|---|---|
| EP | 0745951 | 12/1996 |
| EP | 0840107 | 6/1998 |
| EP | 0957448 | 11/1999 |
| EP | 0574024 | 9/2001 |

(Continued)

OTHER PUBLICATIONS

Cognex Corporation, "Cognex Expands Reading Capability", Natick, MA, (Oct. 9, 2007).

(Continued)

*Primary Examiner* — Tuyen K Vo

(57) ABSTRACT

A method and apparatus for use with a camera that includes a field of view (FOV), the method for selecting a portion of the field of view for analysis and comprising the steps of placing at least a portion of a first object within the field of view of the camera, providing a light source separate from the camera, directing the light source toward the first object within the field of view of the camera so that the light forms an aiming pattern that is one of on and proximate a first location of interest on the first object, obtaining an image of the portion of the first object within the field of view including the aiming pattern, identifying the location of the aiming pattern in the obtained image and using the aiming pattern in the obtained image to perform a processing function.

36 Claims, 11 Drawing Sheets

U.S. PATENT DOCUMENTS

| | | | |
|---|---|---|---|
| 5,399,846 A | 3/1995 | Pavlidis et al. | |
| 5,471,043 A | 11/1995 | Knapp et al. | |
| 5,473,150 A | 12/1995 | Huhn et al. | |
| 5,500,516 A | 3/1996 | Durbin | |
| 5,513,264 A | 4/1996 | Wang et al. | |
| 5,521,366 A | 5/1996 | Wang et al. | |
| 5,569,902 A | 10/1996 | Wood et al. | |
| 5,572,006 A | 11/1996 | Wang et al. | |
| 5,587,843 A | 12/1996 | Chen | |
| 5,596,368 A | 1/1997 | Capper et al. | |
| 5,598,007 A | 1/1997 | Bunce et al. | |
| 5,627,360 A | 5/1997 | Rudeen | |
| 5,640,001 A | 6/1997 | Danielson et al. | |
| 5,659,167 A | 8/1997 | Wang et al. | |
| 5,672,858 A * | 9/1997 | Li et al. | 235/462.04 |
| 5,715,095 A | 2/1998 | Hiratsuka et al. | |
| 5,734,153 A | 3/1998 | Swartz et al. | |
| 5,756,981 A | 5/1998 | Roustaei et al. | |
| 5,773,810 A | 6/1998 | Hussey et al. | |
| 5,783,811 A | 7/1998 | Feng et al. | |
| 5,786,586 A | 7/1998 | Pidhirny et al. | |
| 5,793,033 A | 8/1998 | Feng et al. | |
| 5,811,828 A | 9/1998 | Laser | |
| 5,825,006 A | 10/1998 | Longacre et al. | |
| 5,825,559 A | 10/1998 | Johnson et al. | |
| 5,834,754 A | 11/1998 | Feng et al. | |
| 5,844,229 A | 12/1998 | Rockstein et al. | |
| 5,945,658 A | 8/1999 | Salatto et al. | |
| 5,949,057 A | 9/1999 | Feng | |
| 5,969,321 A | 10/1999 | Danielson et al. | |
| 5,992,751 A | 11/1999 | Laser | |
| 6,060,722 A | 5/2000 | Havens et al. | |
| 6,066,857 A | 5/2000 | Fantone et al. | |
| 6,073,851 A | 6/2000 | Olmstead et al. | |
| 6,098,887 A | 8/2000 | Figarella et al. | |
| 6,179,208 B1 | 1/2001 | Feng | |
| 6,216,953 B1 | 4/2001 | Kumagai et al. | |
| 6,223,986 B1 | 5/2001 | Bobba et al. | |
| 6,223,988 B1 | 5/2001 | Batterman et al. | |
| 6,340,114 B1 | 1/2002 | Correa et al. | |
| 6,347,163 B2 | 2/2002 | Roustaei et al. | |
| 6,431,452 B2 | 8/2002 | Feng | |
| 6,445,450 B1 * | 9/2002 | Matsumoto | 356/401 |
| 6,449,430 B1 | 9/2002 | Tasaka et al. | |
| 6,474,556 B2 | 11/2002 | Dickson et al. | |
| 6,527,183 B2 | 3/2003 | Bard et al. | |
| 6,537,291 B2 | 3/2003 | Friedman et al. | |
| 6,607,132 B1 | 8/2003 | Dvorkis et al. | |
| 6,636,298 B1 | 10/2003 | Bachelder | |
| 6,651,886 B2 | 11/2003 | Gurevich et al. | |
| 6,651,888 B1 | 11/2003 | Gurevich et al. | |
| 6,681,994 B1 | 1/2004 | Koenck | |
| 6,689,998 B1 | 2/2004 | Bremer | |
| 6,712,270 B2 | 3/2004 | Leach et al. | |
| 6,729,546 B2 | 5/2004 | Roustaei | |
| 6,765,393 B2 | 7/2004 | Pierenkemper et al. | |
| 6,805,295 B2 | 10/2004 | Barkan et al. | |
| 6,808,114 B1 | 10/2004 | Palestini et al. | |
| 6,809,847 B2 | 10/2004 | McQueen | |
| 6,827,270 B2 | 12/2004 | Yomogida et al. | |
| 6,832,725 B2 | 12/2004 | Gardiner et al. | |
| 6,832,729 B1 | 12/2004 | Perry et al. | |
| 6,837,433 B2 | 1/2005 | Jam et al. | |
| 6,845,915 B2 | 1/2005 | Krichever et al. | |
| 6,866,198 B2 | 3/2005 | Patel et al. | |
| 6,877,664 B1 | 4/2005 | Oliva et al. | |
| 6,891,679 B2 | 5/2005 | Atarashi et al. | |
| 6,918,538 B2 | 7/2005 | Breytman et al. | |
| 6,974,085 B1 | 12/2005 | Koenck | |
| 6,997,385 B2 | 2/2006 | Palestini et al. | |
| 7,007,843 B2 | 3/2006 | Poloniewicz | |
| 7,025,271 B2 | 4/2006 | Dvorkis et al. | |
| 7,025,272 B2 | 4/2006 | Yavid et al. | |
| 7,025,273 B2 | 4/2006 | Breytman et al. | |
| 7,055,747 B2 | 6/2006 | Havens et al. | |
| 7,063,256 B2 * | 6/2006 | Anderson et al. | 235/385 |
| 7,073,715 B2 | 7/2006 | Patel et al. | |
| 7,075,663 B2 | 7/2006 | Canini | |
| 7,077,325 B2 | 7/2006 | Tan et al. | |
| 7,090,137 B1 | 8/2006 | Bennett | |
| 7,128,266 B2 | 10/2006 | Zhu et al. | |
| 7,147,159 B2 | 12/2006 | Longacre et al. | |
| 7,182,260 B2 | 2/2007 | Gurevich et al. | |
| 7,201,318 B2 | 4/2007 | Craen et al. | |
| 7,222,793 B2 | 5/2007 | Patel et al. | |
| 7,224,540 B2 | 5/2007 | Olmstead et al. | |
| 7,264,162 B2 | 9/2007 | Barkan | |
| 7,296,749 B2 | 11/2007 | Massieu | |
| 7,311,260 B2 | 12/2007 | Zosel | |
| 7,315,241 B1 | 1/2008 | Daily et al. | |
| 7,387,246 B2 | 6/2008 | Palestini et al. | |
| 7,395,970 B2 * | 7/2008 | Poloniewicz et al. | 235/462.2 |
| 7,454,841 B2 | 11/2008 | Burns et al. | |
| 7,478,753 B2 | 1/2009 | Patel et al. | |
| 7,549,582 B1 | 6/2009 | Nunnink | |
| 7,686,223 B2 * | 3/2010 | Vinogradov et al. | 235/462.21 |
| 2002/0014532 A1 | 2/2002 | Yomogida et al. | |
| 2002/0034320 A1 | 3/2002 | Mann | |
| 2002/0039099 A1 | 4/2002 | Harper | |
| 2002/0074403 A1 | 6/2002 | Krichever et al. | |
| 2002/0171745 A1 * | 11/2002 | Ehrhart | 348/231.3 |
| 2002/0191309 A1 | 12/2002 | Taylor et al. | |
| 2003/0019934 A1 | 1/2003 | Hunter et al. | |
| 2003/0020491 A1 | 1/2003 | Perenkemper et al. | |
| 2003/0062413 A1 | 4/2003 | Gardiner et al. | |
| 2003/0201327 A1 | 10/2003 | Jam et al. | |
| 2003/0205620 A1 | 11/2003 | Byun et al. | |
| 2003/0226895 A1 | 12/2003 | Havens et al. | |
| 2004/0020990 A1 | 2/2004 | Havens et al. | |
| 2004/0238637 A1 | 12/2004 | Russell et al. | |
| 2005/0035204 A1 * | 2/2005 | Knappert et al. | 235/462.2 |
| 2005/0045725 A1 | 3/2005 | Gurevich et al. | |
| 2005/0103851 A1 | 5/2005 | Zhu et al. | |
| 2005/0103854 A1 | 5/2005 | Zhu et al. | |
| 2005/0103857 A1 | 5/2005 | Zhu et al. | |
| 2005/0103858 A1 | 5/2005 | Zhu et al. | |
| 2005/0133601 A1 | 6/2005 | Yomogida et al. | |
| 2005/0167504 A1 | 8/2005 | Mier et al. | |
| 2005/0180037 A1 | 8/2005 | Masterson | |
| 2005/0199725 A1 | 9/2005 | Caraen et al. | |
| 2006/0027659 A1 | 2/2006 | Patel et al. | |
| 2006/0034596 A1 | 2/2006 | Yamazaki et al. | |
| 2006/0043187 A1 * | 3/2006 | He et al. | 235/462.2 |
| 2006/0043191 A1 | 3/2006 | Patel et al. | |
| 2006/0055819 A1 | 3/2006 | Pokrovsky et al. | |
| 2006/0060653 A1 | 3/2006 | Wittenberg et al. | |
| 2006/0081712 A1 | 4/2006 | Rudeen et al. | |
| 2006/0213994 A1 * | 9/2006 | Faiz et al. | 235/462.05 |
| 2007/0057067 A1 | 3/2007 | He | |
| 2007/0131770 A1 | 6/2007 | Nunnink | |
| 2007/0164115 A1 * | 7/2007 | Joseph et al. | 235/462.21 |
| 2007/0241195 A1 * | 10/2007 | Hussey et al. | 235/462.21 |
| 2008/0121168 A1 | 5/2008 | Ryznar et al. | |
| 2009/0057413 A1 * | 3/2009 | Vinogradov et al. | 235/462.35 |
| 2009/0159684 A1 * | 6/2009 | Barber et al. | 235/462.41 |
| 2009/0200380 A1 * | 8/2009 | Longacre et al. | 235/462.11 |
| 2010/0177319 A1 | 7/2010 | Towers et al. | |
| 2011/0019106 A1 | 1/2011 | Kimura et al. | |
| 2011/0019162 A1 | 1/2011 | Huebner | |
| 2011/0019914 A1 | 1/2011 | Bimber et al. | |

FOREIGN PATENT DOCUMENTS

| | | |
|---|---|---|
| EP | 01519298 | 3/2005 |
| JP | 10134133 | 5/1998 |
| JP | 09128471 | 5/2006 |
| WO | WO-9816896 | 4/1998 |
| WO | WO-03062956 | 7/2003 |
| WO | WO-2005041111 | 5/2005 |
| WO | WO-2005050390 | 6/2005 |
| WO | WO-2005073895 | 8/2005 |
| WO | WO-2010036403 | 4/2010 |

OTHER PUBLICATIONS

Cognex Corporation, DataMan 100 SHD/C-Mount Kit Removal Instructions, 590-7042, 2007.

* cited by examiner

METHOD AND APPARATUS USING AIMING PATTERN FOR MACHINE VISION TRAINING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to machine vision systems and more specifically to a system wherein an aiming pattern can be generated and directed at an area or feature on an object to be imaged to select the feature or object for enhanced analysis.

Machine vision systems have been developed for use in automated inspection systems that capture images of objects within a field of view and examine the objects to determine if the objects have expected features. Where expected features are not present, in some cases the objects are rejected, in other cases an automated process may have to be halted and in still other cases objects have to be reoriented. In early inspection systems object features of interest had to be manually programmed which was complicated and time consuming.

More recent inspection systems have been developed wherein object features of interest are identified during a commissioning procedure wherein an image of an exemplary object to be inspected is obtained and a processor runs a program to identify object features of interest for inspection. In many cases not all image features are of interest for inspection. For instance, in some cases lighting of an object may be such that different portions of a flat or slightly curved surface appear in a captured image to form an edge. Here, the apparent edge is not in fact an edge and typically would not be of interest during object inspection. To help a processor identify features of interest many commissioning procedures require a system user to examine a commissioning image and identify specific image areas or portions that include features of interest that should be identified and trained or learned. Thus, for instance, where two true object edges are adjacent and their relative lengths and juxtapositions are important, the image may be provided on a computer screen and a mouse or other input device may be used to select an area including the two edges after which the training process can commence.

In addition to being usable to specify image areas for training purposes, on-screen images and input devices can also be used to identify different image features for other types of processing. For instance, once an image is captured, a mouse or other input device may be used to select two different points on the image (i.e., points corresponding to image features of interest) for measuring a dimension (e.g., a length, a separation dimension, etc.). Moreover, other features of on screen images can be manually selected for further processing such as specific information marks/symbols (e.g., bar codes) to be decoded, regions of interest that should be searched for known features, etc.

Unfortunately many inspection systems do not include an output device such as a display screen that can be used to examine a commissioning image and to identify portions/areas of the image that include features of interest for training purposes or for identifying features for additional processing.

Thus, it would be advantageous to have a system that allows a user to identify object areas or features for additional processing or training where a display screen and associated input device are not required.

U.S. Pat. No. 6,340,114 teaches a bar code reader that includes an aiming pattern generating device that includes a light source that directs an aiming pattern along a trajectory substantially parallel to the axis of a reader field of view. This patent teaches that two images of a field of view are obtained in rapid succession, one image with the aiming pattern on and the other with the aiming pattern off. Where the field of view is much larger than a bar code to be imaged and decoded, the aiming pattern is placed on the bar code to be read and the two images are obtained. The location of the aiming pattern in the first image is identified and the location information is used to identify an area in the second image in which the bar code should be sought. Here, the aiming device is an integral part of the code reader assembly.

These and other objects and advantages of the invention will be apparent from the description that follows and from the drawings which illustrate embodiments of the invention, and which are incorporated herein by reference.

BRIEF SUMMARY OF THE INVENTION

It has been recognized that a simple aiming device that is separate from a reader can be provided that can generate an illumination aiming pattern on a feature or area of interest on an object so that when an image of the object including the aiming pattern is captured, the pattern can be recognized within the captured image and processing associated therewith can be performed on the feature or area of interest. For example, in the case of a training commissioning procedure, a hand held laser aiming device may be controlled to generate a rectilinear area defining pattern that can be directed at an object to define an area on the object in which features exist that should be learned for subsequent inspections. Here, when an image of the object is captured, the aiming pattern and area defined thereby can be identified and the leaning process can be performed to identify object features of interest within the area. Thereafter the learned features can be stored to facilitate subsequent inspections.

In a general sense at least some embodiments of the invention include methods whereby a process is specified for image features or an image area that is to be identified by the aiming pattern and then, when an image is obtained including the aiming pattern, the aiming pattern is identified, features or the area associated with the aiming pattern are identified and the specified process is performed.

It has also been recognized that an aiming device separate from a reader may be provided that is useable to generate several different aiming patterns where the different aiming patterns indicate different functions to be performed by a processor that interprets collected images. For instance, the aiming device may be controllable by a user to generate any one of a cross shaped aiming pattern, a doughnut shaped aiming pattern or an arrow shaped aiming pattern where each of the three different patterns indicates a different type of inspection process. In this case, when an image is obtained with one of the aiming patterns in the image, an imaging processor identifies the aiming pattern in the image, identifies the type of aiming pattern in the image and then performs the type of inspection process that is associated with the aiming pattern in the image.

Moreover, it has been recognized that an imager device may be used in a video mode to obtain a plurality of images in a rapid sequence while an aiming device is used to indicate an area within the imager's field of view. For instance, an aiming device that forms a dot type pattern may be used to effectively draw a pattern around an area in the field of view that is of interest while the image sequence is obtained for further examination. As another instance, an aiming device may be used to indicate four separate corners of an area of interest in the field of view while the image sequence is obtained. Thereafter, an image processor can examine the image sequence and identify the area of interest and perform processing functions on the area of interest in one of the obtained images.

Consistent with the above, at least some inventive embodiments include a method for use with a camera that includes a field of view (FOV), the method for selecting a portion of the field of view for analysis and comprising the steps of: (a) placing at least a portion of a first object within the field of view of the camera (b) providing a light source separate from the camera where the light source can be positioned separately from the camera, (c) directing the light source toward the first object within the field of view of the camera so that the light forms an aiming pattern that is one of on and proximate a first location of interest on the first object, (d) obtaining an image of the portion of the first object within the field of view including the aiming pattern; (e) identifying the location of the aiming pattern in the obtained image and (f) using the aiming pattern in the obtained image to perform a processing function.

In at least some cases the step of performing a processing function includes performing a feature learning process on a fractional portion of the image proximate the aiming pattern to identify object features and storing learned features for subsequent object inspection. In some cases the aiming pattern defines an area on the object and the step of performing the feature learning process on a fractional portion includes performing the process on the portion of the image within the area defined by the aiming pattern. In some cases the method further includes the steps of placing at least a portion of a second object within the field of view of the camera, obtaining an image of the portion of the second object within the field of view and analyzing the image of the portion of the second object within the field of view to locate at least one of the learned features.

In some embodiments the method further includes the step of storing information related to the location of the aiming pattern in the obtained image for use during analysis of subsequently obtained images of other objects. In some cases the obtained image is a first image, the method further including the steps of, with the aiming pattern off, obtaining a second image of the portion of the first object within the field of view and wherein the step of using the aiming pattern in the first image includes using the location of the aiming pattern in the first image to select a portion of the second image for further processing. In some cases the step of providing a hand held light source includes providing a pencil beam forming hand held light source.

In some cases the method further includes the step of repeating steps (b) through (e) for at least a second location of interest. In some cases the method further includes the step of repeating steps (b) through (d) for a plurality of locations of interest, the locations of interest together defining a field of view subsection, the step of storing including storing information specifying the field of view subsection.

In some cases the aiming pattern is used to define a line having a length dimension and the step of performing a processing function includes determining the length dimension of the line. In some cases the step of performing a processing function includes searching a portion of the image proximate the aiming pattern for features of interest. In some cases the step of providing a light source separate from the camera includes providing a hand held light source.

In at least some embodiments the step of providing a light source includes providing a light source that can be controlled to generate any of a plurality of different aiming patterns, the method further including selecting one of the aiming patterns to be generated by the light source and, after the step of identifying the location of the aiming pattern in the obtained image, identifying the type of aiming pattern in the obtained image and identifying a specific processing function to be performed as a function of the type of aiming pattern identified.

Some embodiments include a method for use with a camera having a field of view (FOV), the method for use during a commissioning procedure to identify at least a first FOV subsection, the method comprising the steps of (a) placing at least a portion of a first object of the first type within the field of view, (b) directing a hand held light source toward the first object within the field of view of the camera so that the light forms an aiming pattern that is one of on and proximate a first feature of interest on the first object, (c) obtaining an image of the portion of the first object within the field of view, (d) identifying the location of the aiming pattern in the obtained image, and (e) using the location of the aiming pattern in the obtained image to perform a processing function.

In some embodiments the step of using the location of the aiming pattern includes selecting a first image portion of interest which corresponds to a fraction of the obtained image proximate the aiming pattern and which also corresponds to a field of view subsection and performing a processing function on the first image portion. In some cases the step of performing a processing function includes examining the first image portion of interest for at least one object feature, the step of storing including, when the at least one object feature is identified, storing information associated with the at least one object feature. In some cases the step of directing a hand held light source includes using a pencil beam forming hand held light source.

Some embodiments include a system for obtaining an image of an object within a field of view (FOV) and selecting a portion of the image for analysis, the system comprising a data collector for obtaining an image of a first object within a data collector field of view (FOV), a light source that is separate from the data collector and that is separately positionable from the data collector for, when a portion of a first object is within the field of view of the data collector, directing light toward the first object within the field of view so that the light forms an aiming pattern that is one of on and proximate a first location of interest on the first object and a processor programmed to identify the location of the aiming pattern in the obtained image and to use the aiming pattern in the obtained image to perform a processing function.

In some cases the processor performs a processing function by performing a feature learning process on a fractional portion of the image proximate the aiming pattern to identify object features and storing learned features for subsequent object inspection. In some embodiments the aiming pattern defines an area on the object and the processor performs the feature learning process on a fractional portion by performing the process on the portion of the image within the area defined by the aiming pattern.

In some embodiments the processor further stores information related to the location of the aiming pattern in the obtained image for use during analysis of subsequently obtained images of other objects. In some cases the light source is a handheld light source. In some cases the light source is a laser beam light source. In some cases the aiming pattern defines a line having a length dimension and the processor determines the length dimension of the line within the obtained image. In some cases the processor performs a processing function by searching a portion of the image proximate the aiming pattern for features of interest.

Some embodiments include a method for use with a camera that includes a field of view (FOV), the method for selecting points within the field of view for analysis, the method comprising the step of placing at least a portion of a first object within the field of view of the camera, directing a light source toward the first object within the field of view of the camera so that the light forms an aiming pattern on the object at a first location of interest, obtaining a first image of the portion of the first object within the field of view, identifying the location of the aiming pattern in the first image, with the first object still within the field of view of the camera, directing the light source toward the first object within the field of view of the camera so that the light forms an aiming pattern on the object at a second location of interest, obtaining a second image of the portion of the first object within the field of view, identifying the location of the aiming pattern in the second image and using the identified locations of the aiming pattern in the first and second images to perform a processing function.

Still other embodiments include a method for use with a camera that includes a field of view (FOV), the method for selecting a function to be performed on an image obtained by the camera and comprising the steps of forming any one of a plurality of different illumination aiming patterns on at least one surface of an object within the field of view of the camera, obtaining an image of the first object within the field of view including the aiming pattern, identifying the type of aiming pattern in the obtained image and identifying a process associated with the identified aiming pattern wherein a different process is associated with each different aiming pattern.

In some embodiments the method further includes the step of performing the identified process that is associated with the identified aiming pattern. In some cases a different process is associated with each of the different aiming patterns and wherein each of the processes is an inspection process. In some cases the method further includes the steps of providing a light source controllable to generate any of a plurality of different aiming patterns, selecting the one of the plurality of different aiming patterns to be generated by the light source and directing the selected aiming pattern toward the first object within the field of view of the camera so that the light forms the aiming pattern.

In some cases the step of obtaining an image and the step of using a light source include using a light source that is separate from the imager used to obtain the image. In some cases the method further includes identifying the location of the aiming pattern in the obtained image and performing the identified process on a portion of the image associated with the location of the aiming pattern in the image.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
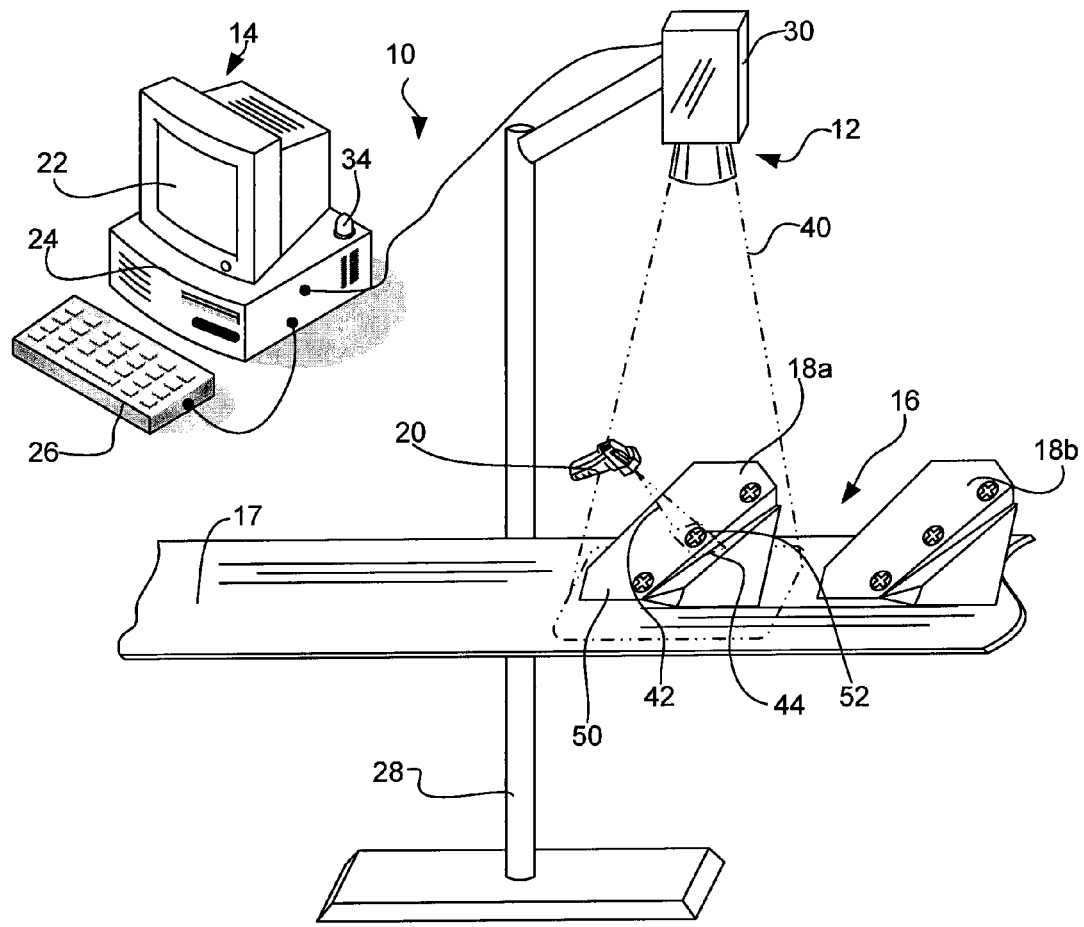
FIG. 1 is a schematic illustrating an exemplary machine vision system that is consistent with at least some aspects of the present invention.

Referring now to the drawings wherein like reference numerals correspond to similar elements throughout the several views and, more specifically referring to FIG. 1, the present invention will be described in the context of an exemplary object imaging system 10 including a camera 12, a workstation 14, a transfer line 16, a plurality of objects to be imaged, two of which are identified by 18a and 18b, and a handheld aiming device 20. Referring also to FIG. 2, workstation 14 includes a display 22, a processor 24, a keyboard/input device 26, a memory 32 and a receiver 34. Processor 24 is linked to each of the display 22, keyboard 26, memory 32 and receiver 34. Programs run by processor 24 are stored in memory 32. Processor 24 provides output to a system user via a display 22. Processor 24 receives user input via the keyboard input device 26 and can also receive wireless transmissions via receiver 34. Receiver 34 is akin to an access point in a wireless network or the like.

Figure 2:
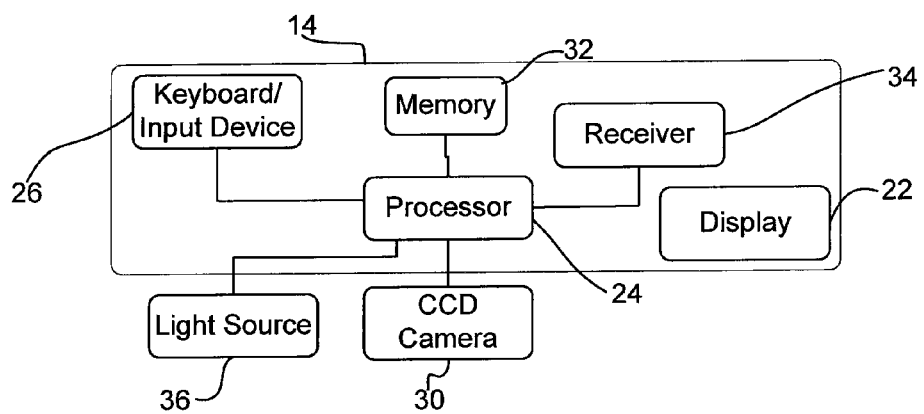
FIG. 2 is a schematic illustrating various components of the workstation shown in FIG. 1.

Referring still to FIGS. 1 and 2, processor 24 is also linked to the camera 30 for receiving information therefrom and providing control signals thereto. Camera 30 includes a field of view 40 (see again FIG. 1) that can be directed toward objects to be imaged. Although not shown in FIG. 1, a light source 36 may be integrated with the camera 30 or there may be a separate light source for shining light within the field of view 40 of the camera 30 to illuminate objects within the field of view to be imaged. Processor 24 may be linked to light source 36 for providing control signals thereto to turn on the light source during imaging activity.

Referring once again to FIG. 1, in the illustrated embodiment, camera 30 is supported by a camera support stand 28 so that the camera faces downward and the field of view 40 is stationary. Transfer line 16 includes a transfer line belt or the like, a portion of which is identified by numeral 17, for transferring objects into the field of view 40 of camera 30 to be imaged. In FIG. 1, two exemplary objects to be imaged are identified by numerals 18a and 18b. Each of the objects 18a and 18b is similarly configured and therefore, in the interest of simplifying this explanation, only object 18a will be described in any detail. Object 18a includes, among other surfaces, a first generally flat surface 50 where three cross-shaped patterns are formed near a lateral edge. One of the cross-shaped patterns on surface 50 is identified by numeral 52.

Figure 3:
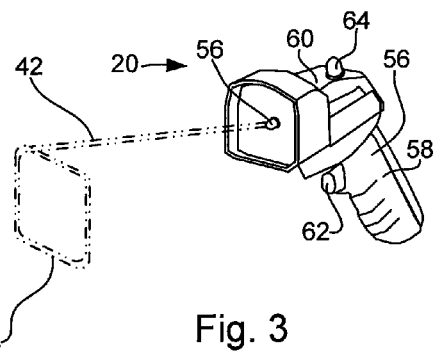
FIG. 3 is a perspective view of the exemplary aiming device shown in FIG. 1.
Figure 4:
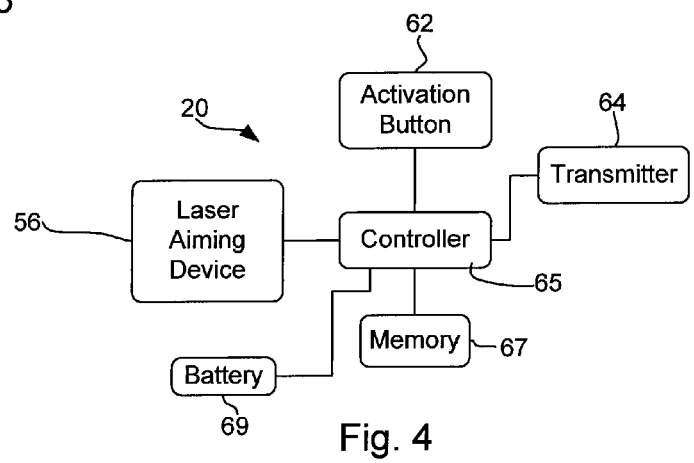
FIG. 4 is a schematic illustrating the various components of at least one embodiment of the aiming device shown in FIG. 3.

Referring once again to FIG. 1 and also now to FIGS. 3 and 4, aiming device 20 is a handheld light generating device that can be controlled to generate a light pattern on one of the objects (e.g., 18a) to be imaged. To this end, device 20 includes a housing structure 58 that has a grip portion 58 and a barrel portion 60. An activation button 62 is provided on a front portion of the grip portion 58. A laser mechanism 56 is housed within barrel 60 so that a distal end thereof extends from the distal end of barrel 60. The laser mechanism 56 can be controlled to form any of several different laser patterns. For example, as shown in FIG. 3, laser 56 may be controlled to form a rectilinear or square aiming pattern 44. Other aiming patterns that may be formed by laser 56 include a line, a dot or point, a plurality of points that together define an aiming space therebetween, etc.

In addition to the components above, the illustrated aiming device 20 also includes a transmitter 64, a memory 67, a controller 65 and a battery 69 (see again FIG. 4). The controller 65 is linked to each of the laser device 56, activation button 62, transmitter 64, memory 67 and battery 69. In at least some embodiments, device 20 only generates a laser aiming pattern when the activation button 62 is pressed. In some embodiments, activation button 62 may have two different activation states, one state for turning on the laser and generating the aiming pattern 44 and a second state causing the controller 65 to transmit a signal via transmitter 64 indicating that the camera 30 (see again FIG. 1) should take a picture of the object within its field of view 40. Thus, for example, button 62 may have three positions including a deactivated position where the button is not pressed, a laser turn on position where the button is pressed to a first or intermediate position and an image capture position where the button 62 is completely pressed. In this case, button 62 may have a detent at the intermediate position so that a device user can easily feel that position when that position is reached.

Referring still to FIGS. 1, 2 and 4, when transmitter 64 transmits an image capture signal, receiver 34 receives that signal and provides that signal to processor 24. Processor 24 in turn controls camera 30 to obtain an image of the object within field of view 40.

As well known in the imaging arts, software has been developed that can be used during a commissioning procedure to allow a processor or workstation to examine an exemplary object to be imaged and automatically identify and learn specific features of the exemplary object so that those features can be subsequently identified during an inspection process of other objects that have similar or identical features. In many cases, specific object features are particularly important while other features are less so and, in these cases, the learning process can be expedited by identifying areas on an object in which the specific features reside so that the learning process can be expedited.

Figure 5:
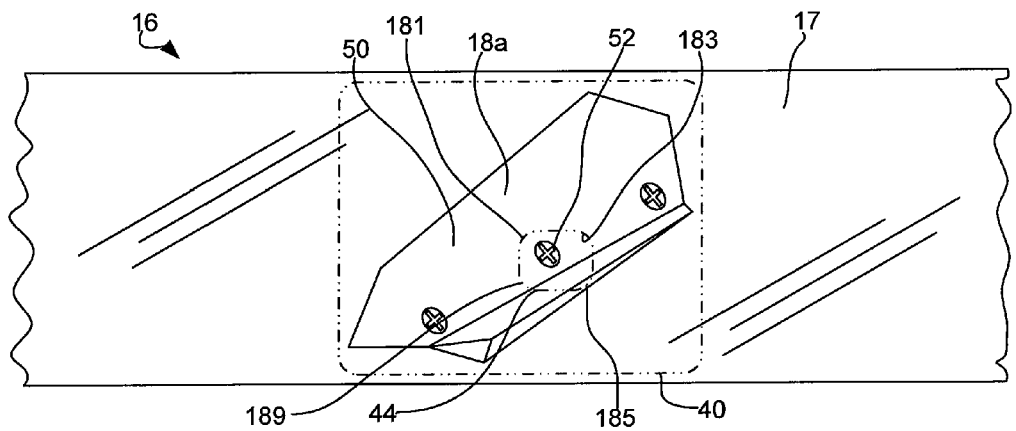
FIG. 5 is a top plan view of an object supported by a transfer line belt where an exemplary aiming patterns is formed on the object.
Figure 6:
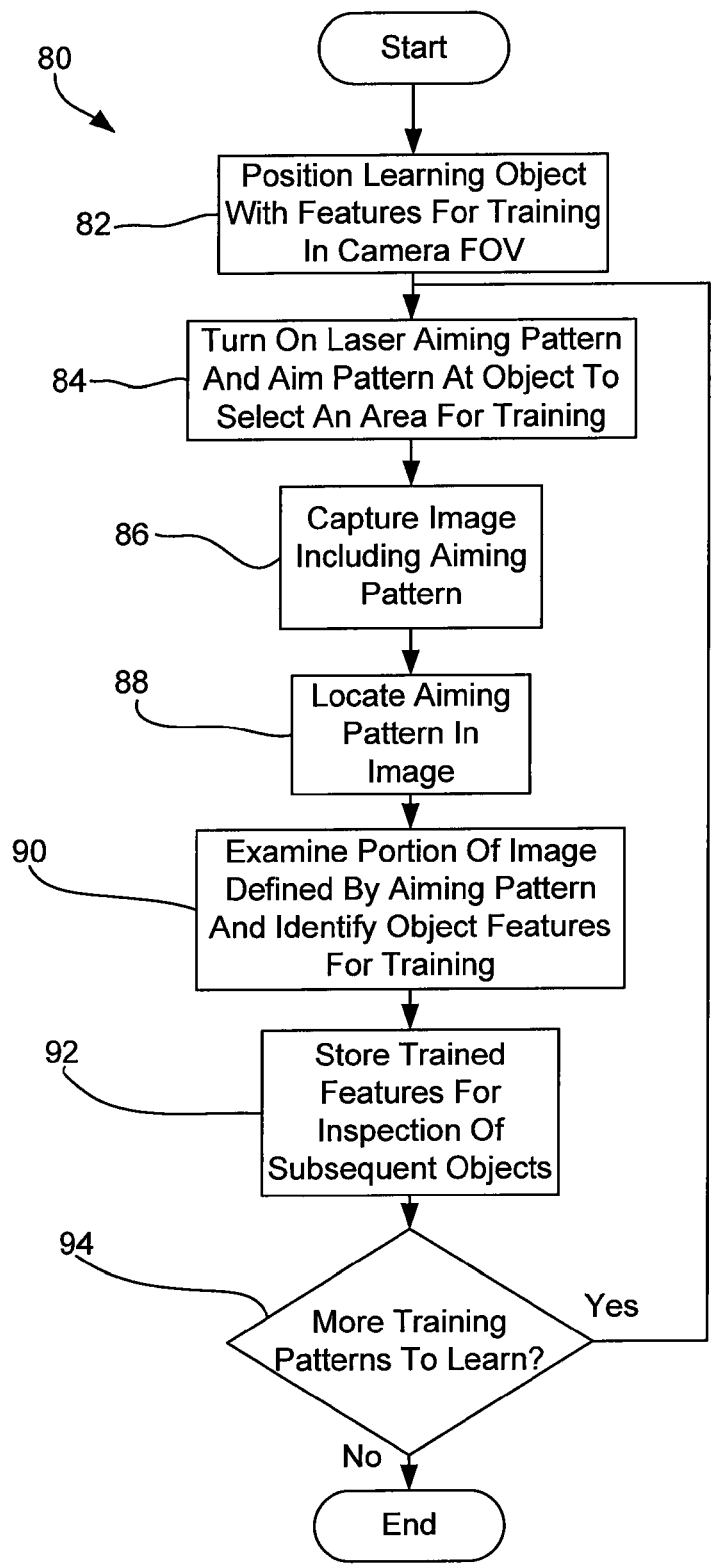
FIG. 6 is a flow chart illustrating a method that is consistent with at least some aspects of the present invention for using the aiming device of FIG. 3 to indicate an area of an object to be examined within an image during a training procedure.

Referring now to FIG. 6, one exemplary method 80 for identifying object areas to be inspected to facilitate an object feature learning process is illustrated. Referring also to FIGS. 1 through 5, at block 82, a learning object 18a is positioned within the camera field of view 40 so that the features to be learned or trained will be captured in an image by the camera 30. At block 84, a user turns on aiming device 20 and points the aiming pattern at the object 18a to select an area or location of interest for training. In FIGS. 1 and 5, an exemplary area for training is identified by numeral 44 and includes the cross-shaped item 52 as well as two lateral edges of the object 18a adjacent item 52. In the above example where the activation button 62 has three positions (i.e., one position deactivated, an intermediate position for generating the aiming pattern 44 and a fully pressed position causing a signal to be transmitted via transmitter 64), at this point, button 62 is in the intermediate position. At block 86, button 62 is fully depressed causing transmitter 64 to transmit an image capture signal wirelessly to receiver 34. When the image capture signal is received, processor 24 causes camera 30 to capture an image of object 18a including aiming pattern 44 where the aiming pattern indicates a fractional portion of the image obtained.

Referring still to FIGS. 1 through 6, at block 88, the captured image is received by processor 24 and the processor 24 locates the aiming pattern 44 (see again FIG. 5) in the image. At block 90, processor 24 runs any of several different learning or training software routines to examine the portion of the image defined by the aiming pattern and to identify object features for training. At block 92, the trained features are stored for inspection of subsequent objects. In the above example, the trained features may include characteristics of the cross-shaped pattern 52, existence of the two lateral edges adjacent pattern 52, dimensions between pattern 52 and the adjacent two edges, dimensions of pattern 52, etc.

At block 94, where additional training patterns or features are to be learned control passes back up to block 84 where the process is repeated for a different area of the object 18a. To this end, aiming device 20 may again be used to select a different portion or area of object 18a for feature training. At block 94 where no more training features are to be learned, the process ends.

Figure 7:
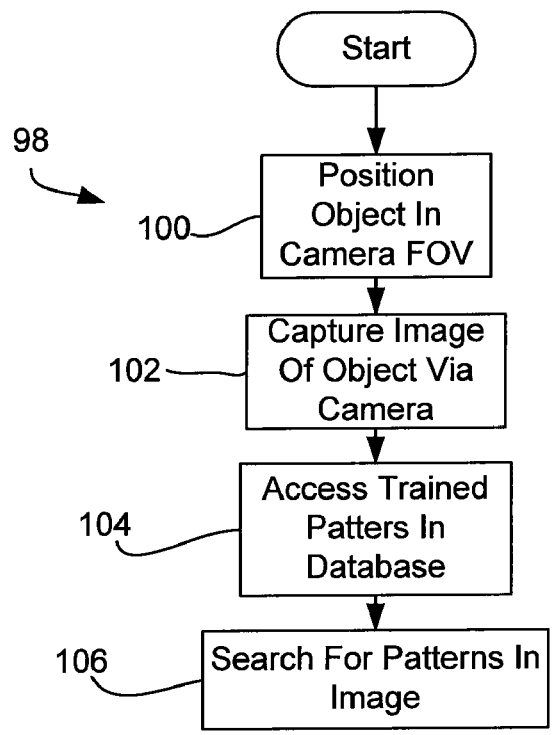
FIG. 7 is a flow chart illustrating a method for using trained patterns to inspect objects for specific features.

Referring now to FIG. 7, a method 98 that may be used to identify trained patterns or features during a subsequent inspection process of other objects (e.g., 18b in FIG. 1) is illustrated. Referring also to FIGS. 1 through 5, at block 100 a subsequent object 18b is moved into the field of view of the camera. At block 102, an image of the object 18b is captured. At block 104 training patterns or features are accessed within the memory/database 32. At block 106, processor 24 searches the image or the training patterns for features.

Figure 8:
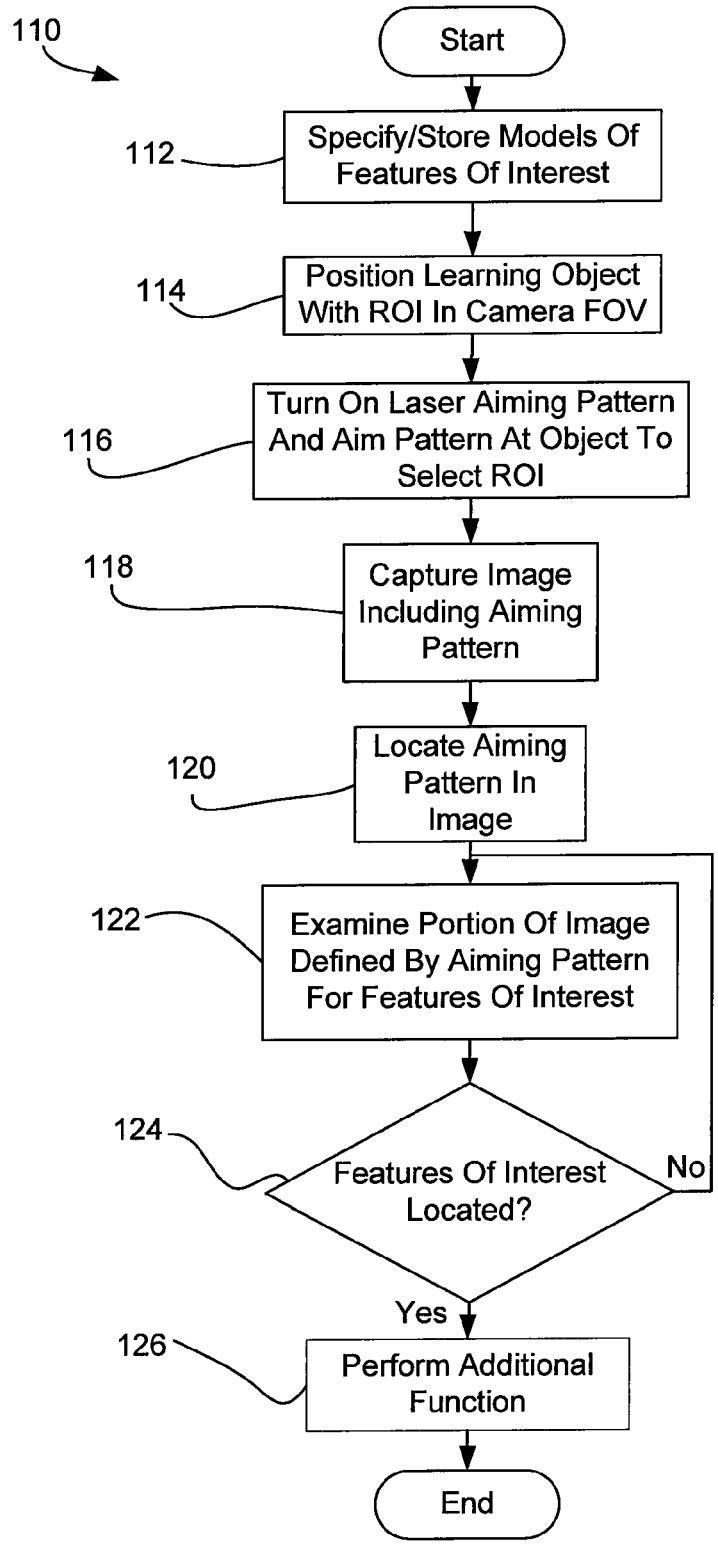
FIG. 8 is a flow chart illustrating a method consistent with at least some aspects of the present invention for using the aiming device of FIG. 3 to identify a region of interest on an object for searching for features of interest.

In addition to being used to identify areas of an object for training or learning purposes, according to another aspect of the present invention, the aiming device 20 can be used to manually identify object areas that should be searched for known specific features. To this end, one method 110 using the aiming device 20 to identify regions of interest for searching for known features of interest is shown in FIG. 8. Referring once again to FIGS. 1 through 5, at block 112 model features of interest are specified and stored. Consistent with the above example, model features of interest may include the cross-shaped pattern 52 along with a dimension between that pattern 52 and an adjacent edge of item 18a. At block 114, the object to be examined or inspected 18a is positioned within the camera field of view 40 so that the area including the features of interest is within the field of view. At block 116, device 20 is activated so that the aiming pattern 44 is generated and the aiming pattern 44 is aimed at the region of interest as shown in FIG. 5. At block 118, camera 30 captures an image of the field of view 40 including the aiming pattern 44. At block 120, process 24 locates the aiming pattern 44 in the image. At block 122, processor 24 examines the portion of the image defined by the aiming pattern for the model features of interest. At block 124, where the features of interest have not been locates, control passes back up to block 122 where multiple attempts to identify the features of interest may occur. Once the features of interest are located, at block 124, control passes to block 126 where additional functions may be performed. For example, additional functions may include an affirming signal to the system user that the features of interest have been identified and are within specific tolerances.

Figure 9:
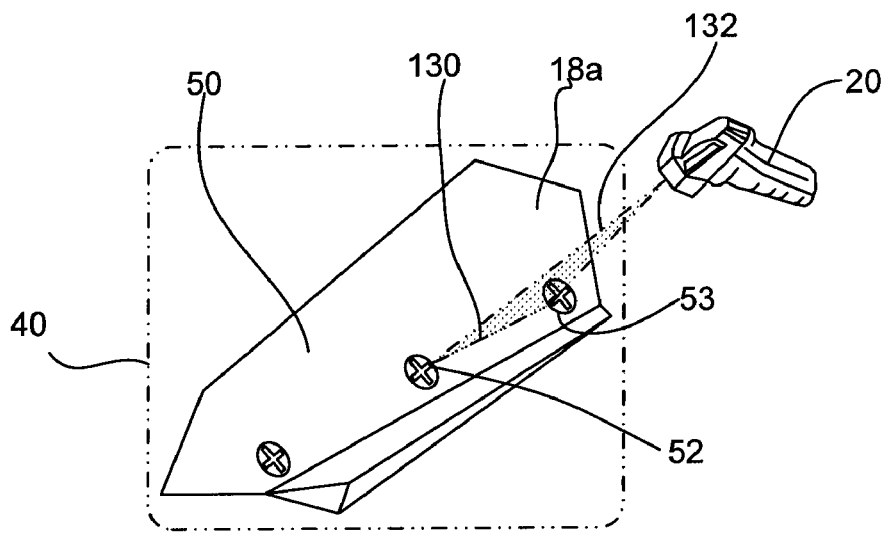
FIG. 9 is a view illustrating the aiming device of FIG. 3 being used to provide a line type aiming pattern on an object being imaged.

According to yet one additional aspect of the present invention, aiming device 20 may also be used to select different characteristics or features of an object being imaged for dimension measuring purposes. Thus, for example, referring now to FIG. 9, where cross-shaped patterns 52 and 53 are spaced apart by a dimension 130, device 20 may be used to identify adjacent edges of patterns 52 and 53 and processor 24 may be programmed to calculate the distance between those adjacent edges. To this end, as seen in FIG. 9, device 20 may generate a planar type laser pattern that forms a line of light 130 on an object to be images. Here, the length of the line 130 may be adjusted and device 20 may be positioned such that the opposite ends of the line 130 define a length dimension to be measured.

Figure 10:
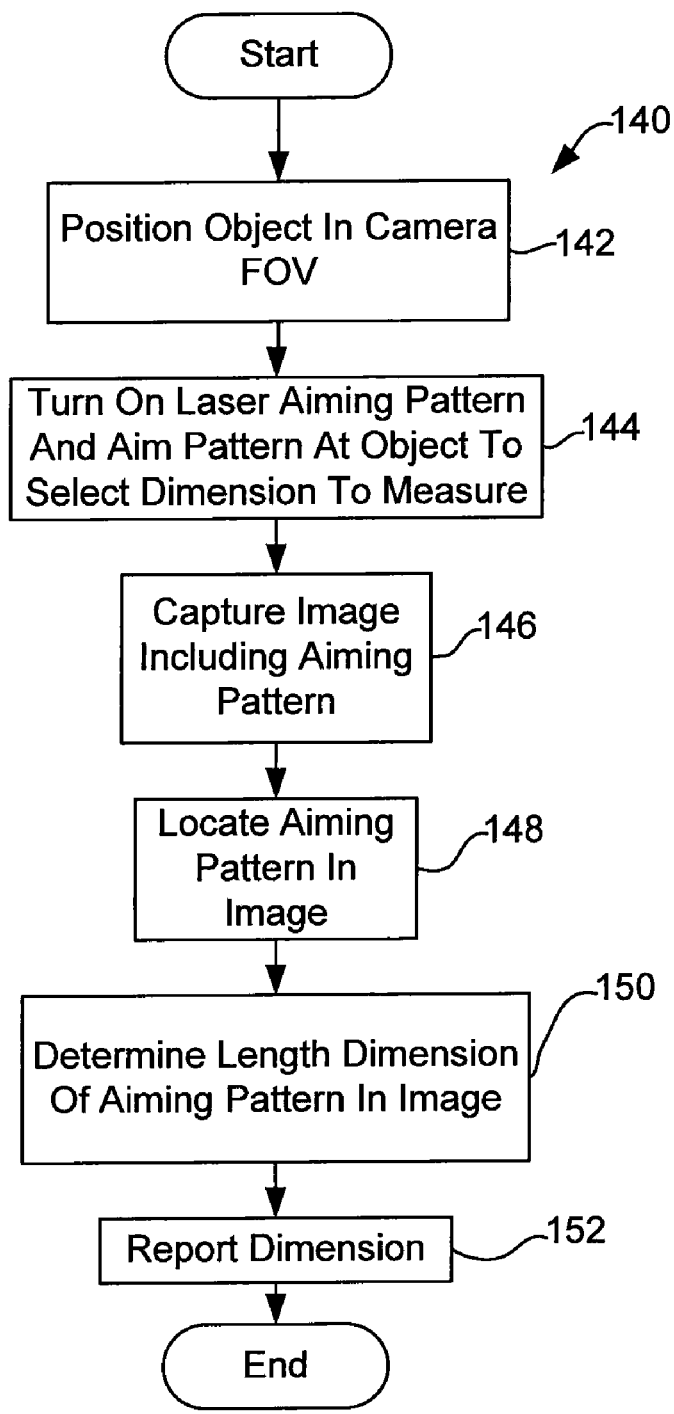
FIG. 10 is a flow chart illustrating a method consistent with at least some aspects of the present invention wherein an aiming pattern on an object is used to identify a length dimension to be determined.

Referring now to FIG. 10, a method 140 for measuring a distance between object characteristics or features is illustrated. Referring also to FIGS. 2, 4 and 9, at block 142, the object 18a is positioned within the camera field of view 40. At block 144, the line forming aiming pattern 132 is turned on and is aimed at the object 18a to select a dimension to be measured. At block 146, camera 30 captures an image of the object 18a including the aiming pattern 130. At block 148, processor 24 locates the aiming pattern in the image and at block 150, processor 24 determines the length dimension of the aiming pattern in the image. At block 152, processor 24 reports the length dimension via display 22 and may also store that length dimension if necessary.

Figure 11:
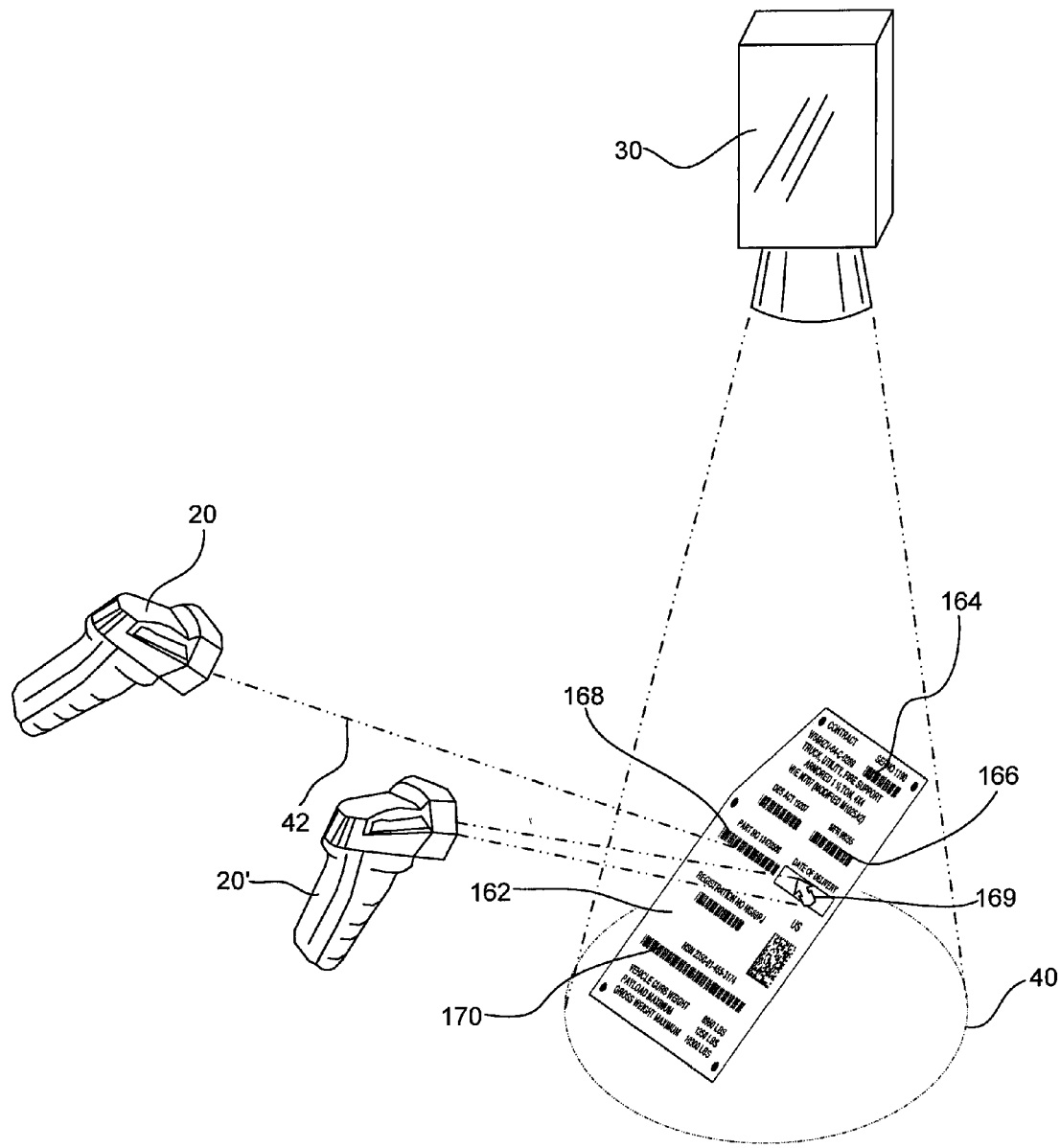
FIG. 11 is a view illustrating the aiming device of FIG. 3 used to identify a specific symbol on a label for decoding.

According to yet another aspect of the present invention, device 20 may be used to select one of several different symbols or marks to be decoded that are located within the camera field of view 40. To this end, refereeing to FIG. 11, an exemplary label 162 is illustrated that includes a plurality of marks or symbols, some of which are identified by numerals 164, 166, 168 and 170. When label 162 is within the field of view 40 so that an image of the entire label is obtained, where only one of the symbols is of interest such as, for instance, symbol 168, that symbol can be selected via device 20. To this end, as shown in FIG. 11, device 20 may be controlled to generate a laser line or point source 42 that can be directed at label 162 so as to impinge on the symbol 168 of interest.

Figure 12:
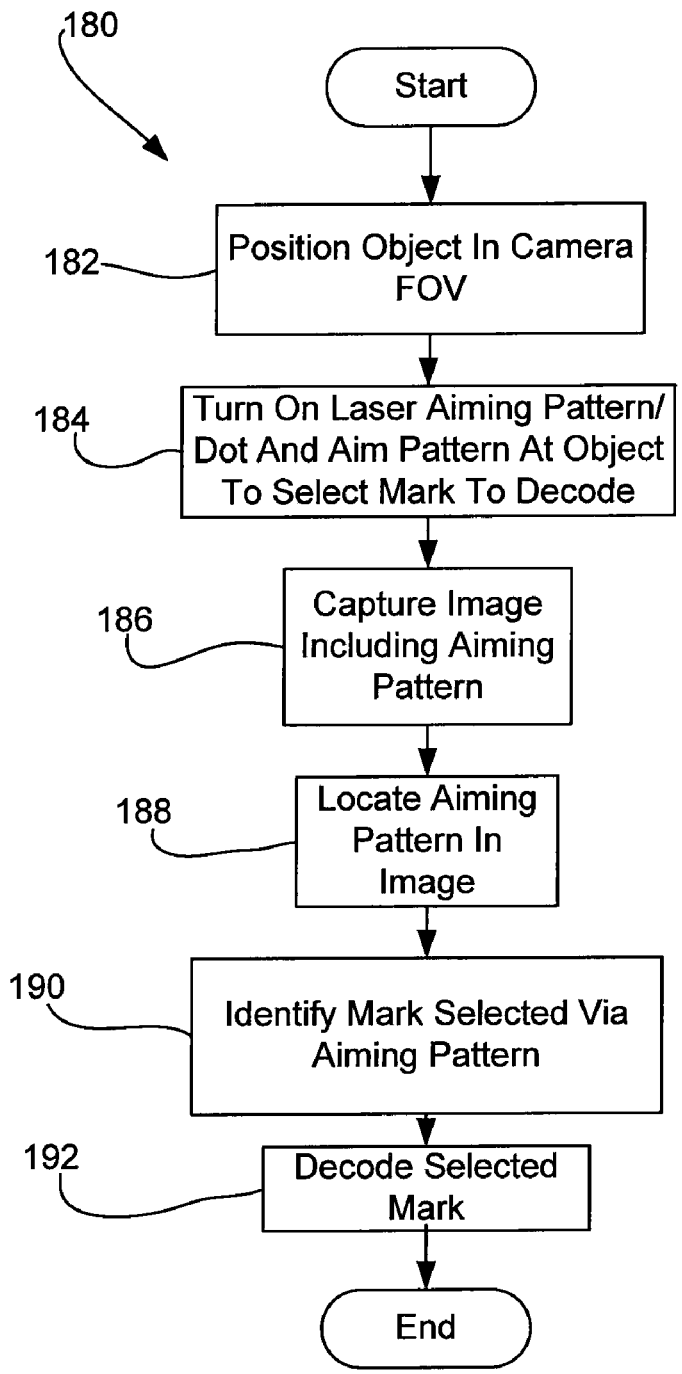
FIG. 12 is a flow chart illustrating a method whereby the aiming device of FIG. 3 is used to identify a mark or symbol within a camera field of view for decoding.

Referring now to FIG. 12, an exemplary method 180 for using device 20 to select a symbol of interest to be decoded is illustrated. Referring also to FIGS. 2, 4 and 11, at block 182 an object including the label 162 is positioned within the camera field of view 40 so that the label 162 can be imaged. At block 184, the laser aiming pattern or dot is turned on and is directed at the mark or symbol 168 to be decoded. At block 186, an image of the label 162 is captured including the aiming pattern or dot. At block 188, processor 24 (see again FIG. 2) locates the aiming pattern or dot in the image and at block 190 processor 24 identifies the mark or symbol 168 selected via the aiming pattern. At block 192 the selected mark 168 is decoded.

Figure 13:
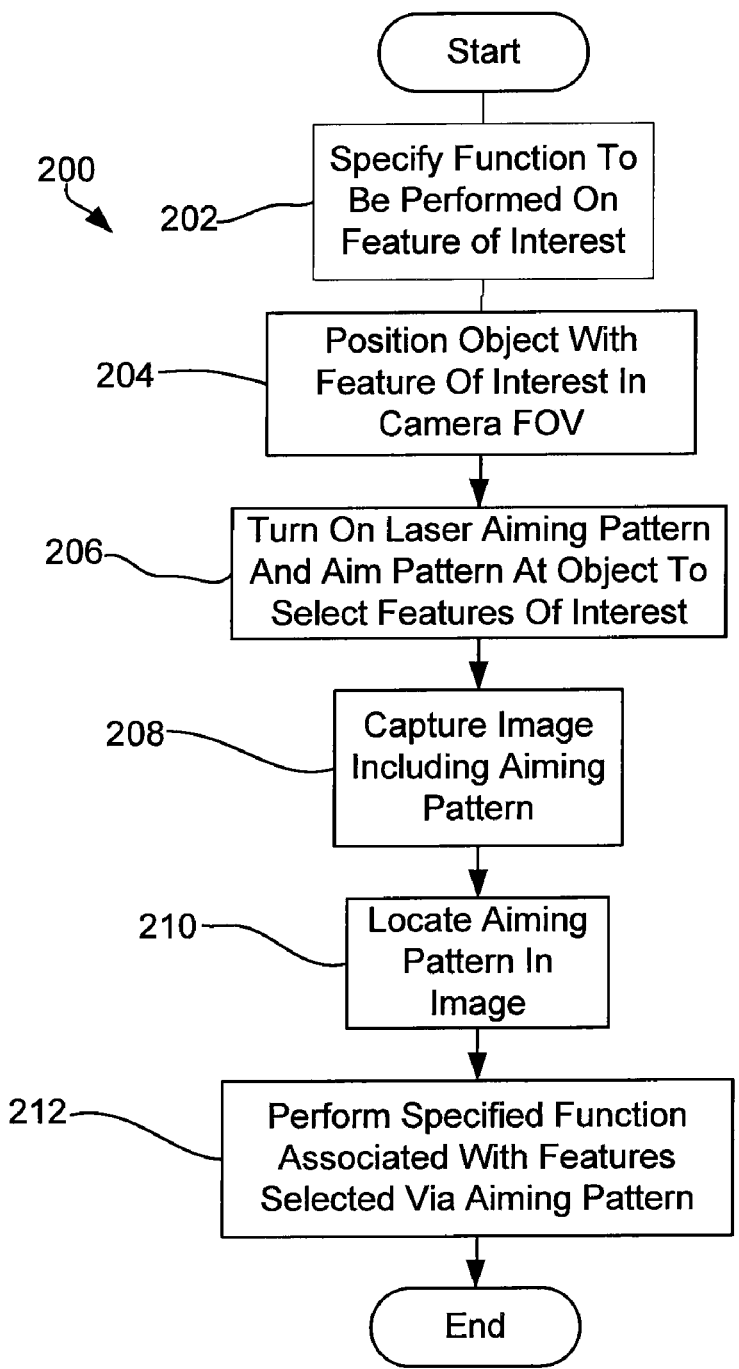
FIG. 13 is a flow chart illustrating a general method whereby an aiming pattern captured by an imaging device is used to facilitate a processing function.

It should be appreciated that the aiming device 20 can be used in conjunction with a camera 30 to perform any function whereby the device 20 is used to generate an aiming pattern on an object to be imaged where the image includes the aiming pattern and some processor function that uses the aiming pattern can then be performed. To this end, referring now to FIG. 13, an exemplary generic method 200 that may be performed using the system shown in FIG. 1 is illustrated. At block 202, a function to be performed on a feature of interest is specified via a processor program stored in memory 32 (see also FIG. 2). At block 204, an object including the feature of interest is positioned within the camera field of view 40. At block 206, the laser aiming pattern of device 20 is turned on and the pattern is aimed at the object to select some feature of interest or area of interest. At block 208, an image including the aiming pattern is captured and at block 210 processor 24 locates the aiming pattern in the image. At block 212, processor 24 performs the specified functions associated with the features selected via the aiming pattern.

In at least some embodiments it is contemplated that the aiming device 20 may be a very simple aiming device that can only generate a pencil beam of light to form a dot or point on an object to be imaged. Here, in at least some embodiments, to define a line for a length measurement or the like as described above, the camera 30 may be used first and second times to obtain two images of an object where the aiming device 20 is used to specify different location is on the object during each image capture process. Thus, for example, referring again to FIG. 9, during a first image capture, device 20 may be used to identify an edge of pattern 52 and during a second image capture, device 20 may be used to identify an edge of pattern 53. Here, processor 24 (see again FIG. 2) will be programmed to recognize that the dimension measurement process should be performed after the two images are obtained and using the two locations within the images specified by the two dot aiming patterns.

Similarly, where device 20 is only capable of generating a pencil laser beam, an area or region of interest for training or for inspection may be specified by obtaining three or more images with device 20 used to indicate different locations on the object being imaged in each one of the three or more images. Thus, for instance, referring again to FIG. 5, during a first image capture, device 20 may be used to identify corner 181 of pattern 44, may be used to identify corner 183 during a second image capture, may be used to identify corner 185 during a third image capture and may be used to identify corner 189 during a fourth image capture.

In a similar fashion, at least some embodiments may include a reader or imager device that can be placed in a video mode where a sequence of images can be obtained in rapid succession over a period. In this case, a pencil beam type aiming pattern may be used while an imager device is collecting video images to draw a circle around an area on an object within the imager device's field of view. Here, the different locations of the pencil beam aiming pattern during the drawing action are obtained in the series of video images. After the drawing process has been completed, processor 24 (see again FIG. 1) examines each of the images in the video sequence to identify the locations of all of the pencil beam patterns in the sequence. Together the patterns in the sequence specify an area of interest in the images for further inspection, learning, etc. Once the area of interest is identified the processor performs an inspection process or some other function on one of the sequence images or on another image of the object obtained without the aiming pattern on.

In still other embodiments it is contemplated that, with an imager device operating in the video mode to obtain a sequence of images in rapid succession, a pencil beam or other type aiming pattern may be used to indicate three or more points within the imager device's field of view that together define a space or region of interest on an object in the field of view. Here, the aiming device is turned on three or more separate times and pointed at locations of interest in the field of view that circumscribe the are of interest. After the area defining points have been indicated and images including the point have been obtained via the imager device, processor 24 (see again FIG. 1) examines each of the images in the video sequence to identify the locations of all of the area defining locations of the aiming pattern. Together the pattern locations in the sequence specify an area of interest in the images for further inspection, learning, etc. Once the area of interest is identified the processor performs an inspection process or some other function on one of the sequence images or on another image of the object obtained without the aiming pattern on.

Referring once again to FIG. 2, where the objects 18*a*, 18*b*, etc., to be inspected are to be juxtaposed in a similar or identical orientation with respect to the camera 30 during an inspection process so that similar features should be located in identical or similar locations within obtained images, in at least some embodiments, it is contemplated that during a training or learning process, in addition to learning and storing object features of interest for subsequent inspection, the locations of those features within the images can be obtained and stored for use during subsequent inspections. Thus, for instance, referring again to FIG. 5, the portion of the image to be defined by aiming pattern 44 may be stored during the commissioning procedure and that same area or portion of subsequent images during an inspection process may be inspected for the features of interest. This step of storing image portions for subsequent inspection can expedite the subsequent inspection processes appreciably.

Figure 14:
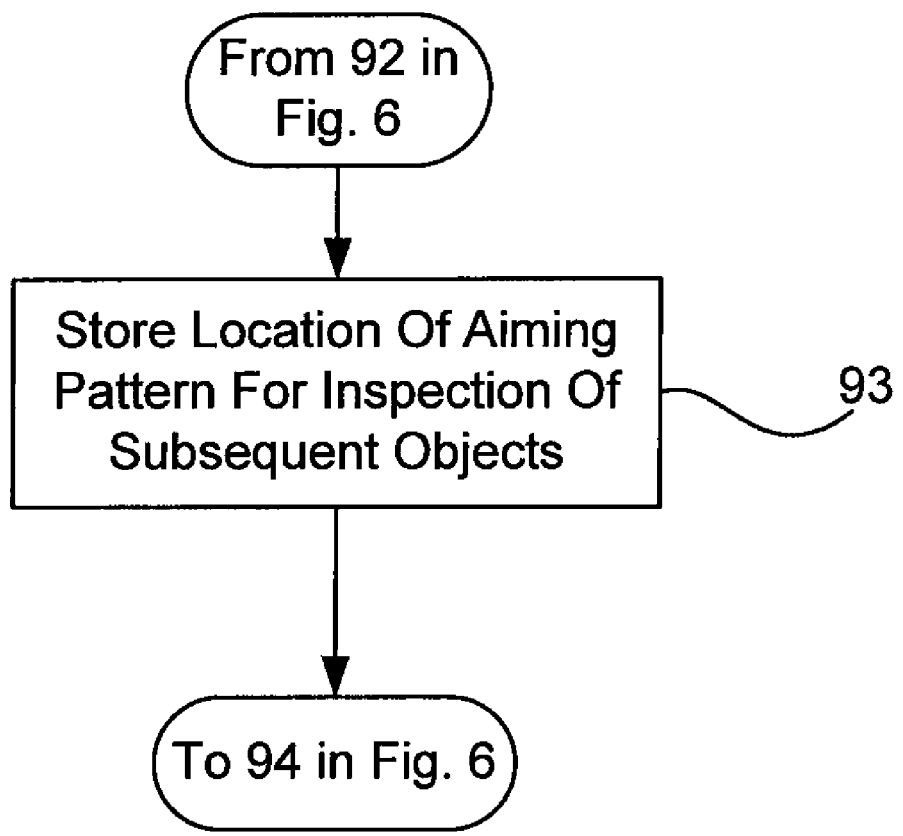
FIG. 14 is a subprocess that may be added to the process of FIG. 6 whereby the location or area specified by an aiming pattern during a commissioning procedure is stored for subsequent use during object inspection procedures.

Referring to FIG. 14, an exemplary subprocess that may be added to the process of FIG. 6 for storing information that specifies a fraction of an image area for subsequent inspection is illustrated. Referring also to FIG. 6, after block 92 where trained features for inspection of subsequent objects have been stored, control passes to block 93 in FIG. 14 where the location of the aiming pattern used during the commissioning procedure is stored for subsequent inspection of other objects. After block 93, control passes to back block 94 in FIG. 6 where the process described above continues.

In at least some embodiments, it is contemplated that the aiming device 20 may only be able to form a simple dot or point type aiming pattern. In these cases, one other way to identify a region of interest in an image of an object is to program the processor 24 (see again FIG. 2) to identify an area about a point in an image as a region of interest. Thus, referring again to FIG. 5, a point or dot aiming pattern may be positioned directly in the middle of the illustrated pattern 44 and processor 24 may be programmed to identify a 4×4 inch space about the dot as a region of interest for feature learning, inspection, etc.

In some embodiments, it is contemplated that the aiming pattern may degrade portions of an image thereby deteriorating the usefulness of the information for its intended purpose (s). For instance, referring again to FIG. 11 where a barcode is to be decoded, it may be that an aiming patterns on a barcode (see 168) will adversely affect decoding of the code upon imaging. Here, in at least some embodiments, instead of selecting a code for decoding by identifying the code impinged by an aiming pattern, processor 24 (see again FIG. 2) may be programmed to select the code that is most proximate an aiming pattern in an obtained image. Thus, here, an aiming device user could aim the aiming pattern (e.g., a dot) at a location immediately adjacent code 168 to select that code for further processing.

In still other embodiments, it is contemplated that where an aiming pattern in an image can deteriorate image data for its intended purpose, two images may be taken in rapid succession instead of one image, where the aiming pattern is on for one of the images and off for the other of the images. In this case, the aiming pattern in the one image can be identified, a location or area associated with the aiming pattern can be determined and that location or area can be used to identify the same location or area in the other image. Thereafter, processing can be performed on the data corresponding to the location or area in the other image in the manner described above.

Figure 15A:
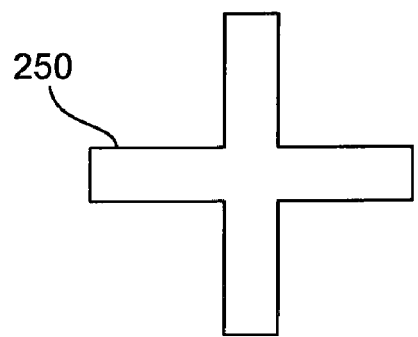
FIGS. 15A-15C are schematics illustrating three different aiming patterns that may be generated by an aiming device in at least some embodiments of the present invention.
Figure 15B:
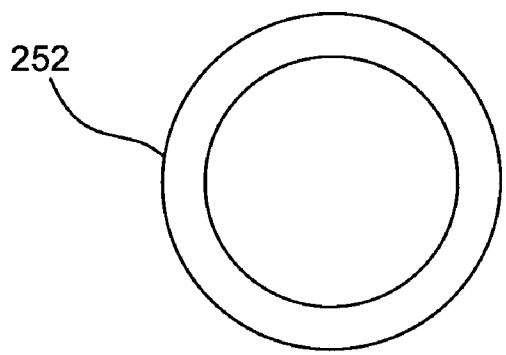
Figure 15C:
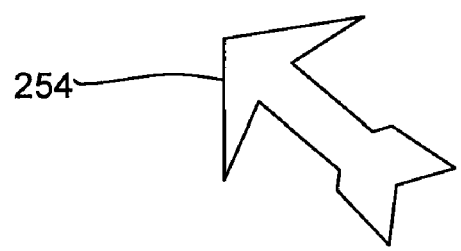

In at least some embodiments it is contemplated that an aiming device 20 may be controllable to generate any of several (e.g., 10, 15, etc.) different aiming patterns and that an imaging processor 24 (see FIG. 2) may be programmed to associate each of the different aiming patterns with a different inspection process or other function (e.g., learning a field of view area of interest for subsequent inspection, etc.) Here, the processor is also programmed to, when an image is obtained, identify an aiming pattern in the image, identify aiming pattern type, associate the aiming pattern type with a specific function or process to be performed and then perform the associated function or process. For example, referring to FIGS. 15A through 15C, where a processor can perform three different inspection processes A, B and C, the different processes A, B and C may be associated with a cross shaped pattern 250 (see FIG. 15A), a doughnut shapes pattern 252 (see FIG. 15B) and an arrow shaped pattern 254 (see FIG. 15C), respectively. In this case, when processor 24 recognizes a doughnut shaped pattern 252 in an image, processor 24 performs inspection function B. Similarly, when processor 24 recognizes a cross or arrow shaped pattern, processor 24 performs functions A and C, respectively. In FIG. 11 an aiming device 20' is illustrated forming an arrow shaped aiming pattern 169 to specify a specific function to be performed. Here, while the aiming device may be separate from the imager device, in at least some embodiments the aiming device may be part of a handheld reader device or the like (i.e., the aiming device and imaging device may be integrated into a single package).

In some embodiments it is contemplated that two or more aiming devices may be used simultaneously to provide two or more aiming patterns on an object to specify either an area or separate areas of interest on the object. For instance, referring again to FIG. 11, two aiming devices 20 and 20' are illustrated where device 20 is used to identify a specific bar code 168 within a field of view 40 while device 20' is used to generate an arrow shaped aiming pattern 169 specifying a location in the field of view corresponding to a date of deliver field. Here, a single image could be obtained with both aiming patterns and processor 24 (see again FIG. 2) may be programmed to identify the locations of both aiming patterns in the obtained image, as well as the aiming pattern types and thereafter may perform different functions on information in different portions of the obtained image. As another instance, three aiming devices could be used simultaneously to indicate three different points on an object that define an area. In this case the processor 24 obtains a single image with the three aiming patterns, identifies the locations of the three patterns and performs a process accordingly.

While a handheld light source is described above, it should be understood that other mounted light sources are contemplated where the light source is still separately positionable from the camera/sensor/data collector.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims.

To apprise the public of the scope of this invention, the following claims are made:

1. A method for use with a camera that includes a field of view (FOV), the method for selecting a portion of the field of view for analysis and comprising the steps of:
   (a) placing at least a portion of a first object within the field of view of the camera;
   (b) providing a light source separate from the camera where the light source can be positioned separately from the camera;
   (c) directing the light source toward the first object within the field of view of the camera so that the light forms an aiming pattern that is one of on and proximate a first location of interest on the first object;
   (d) obtaining an image of the portion of the first object within the field of view wherein the obtained image includes the aiming pattern;
   (e) identifying the location of the aiming pattern in the obtained image; and
   (f) using the aiming pattern in the obtained image to perform a processing function.

2. The method of claim 1 wherein the step of performing a processing function includes performing a feature learning process on a fractional portion of the image proximate the aiming pattern to identify object features and storing learned features for subsequent object inspection.

3. The method of claim 2 wherein the aiming pattern defines an area on the object and the step of performing the feature learning process on a fractional portion includes performing the process on the portion of the image within the area defined by the aiming pattern.

4. The method of claim 2 further including the steps of placing at least a portion of a second object within the field of view of the camera, obtaining an image of the portion of the second object within the field of view and analyzing the image of the portion of the second object within the field of view to locate at least one of the learned features.

5. The method of claim 1 further including the step of storing information related to the location of the aiming pattern in the obtained image for use during analysis of subsequently obtained images of other objects.

6. The method of claim 1 wherein the obtained image is a first image, the method further including the steps of, with the aiming pattern off, obtaining a second image of the portion of the first object within the field of view and wherein the step of using the aiming pattern in the first image includes using the location of the aiming pattern in the first image to select a portion of the second image for further processing.

7. The method of claim 1 wherein the step of providing a light source includes providing a pencil beam forming light source.

8. The method of claim 1 further including the step of repeating steps (b) through (f) for at least a second location of interest.

9. The method of claim 1 further including the step of repeating steps (b) through (e) for a plurality of locations of interest, the locations of interest together defining a field of view subsection, the step of storing including storing information specifying the field of view subsection.

10. The method of claim 1 wherein the step of providing a light source includes providing a light source that can be controlled to generate any of a plurality of different aiming patterns, the method further including selecting one of the aiming patterns to be generated by the light source and, after the step of identifying the location of the aiming pattern in the obtained image, identifying the type of aiming pattern in the obtained image and identifying a specific processing function to be performed as a function of the type of aiming pattern identified.

11. The method of claim 1 wherein the step of performing a processing function includes searching a portion of the image proximate the aiming pattern for features of interest.

12. The method of claim 1 wherein the step of providing a light source separate from the camera includes providing a hand held light source.

13. A method for use with a camera having a field of view (FOV), the method for use during a commissioning procedure to identify at least a first FOV subsection, the method comprising the steps of:
   (a) placing at least a portion of a first object of the first type within the field of view;
   (b) directing a hand held light source toward the first object within the field of view of the camera so that the light forms an aiming pattern that is one of on and proximate a first feature of interest on the first object;
   (c) obtaining an image of the portion of the first object within the field of view wherein the obtained image includes the aiming pattern;
   (d) identifying the location of the aiming pattern in the obtained image; and
   (e) using the location of the aiming pattern in the obtained image to perform a processing function;

wherein the light source is separate from the camera and wherein the light source can be positioned separately from the camera so that the aiming pattern can be aimed at different locations within the field of view of the camera.

14. The method of claim 13 wherein the step of using the location of the aiming pattern includes selecting a first image portion of interest which corresponds to a fraction of the obtained image proximate the aiming pattern and which also corresponds to a field of view subsection and performing a processing function on the first image portion.

15. The method of claim 14 wherein the step of performing a processing function includes examining the first image portion of interest for at least one object feature, the step of storing including, when the at least one object feature is identified, storing information associated with the at least one object feature.

16. The method of claim 13 wherein the step of directing a hand held light source includes using a pencil beam forming hand held light source.

17. A system for obtaining an image of an object within a field of view (FOV) and selecting a portion of the image for analysis, the system comprising:
   a data collector for obtaining an image of a first object within a data collector field of view (FOV);
   a light source that is separate from the data collector and that is separately positionable from the data collector for, when a portion of a first object is within the field of view of the data collector, directing light toward the first object within the field of view so that the light forms an aiming pattern that is one of on and proximate a first location of interest on the first object; and
   a processor programmed to receive an obtained image from the data collector where the obtained image includes the aiming pattern, to identify the location of the aiming pattern in the obtained image and to use the aiming pattern in the obtained image to perform a processing function.

18. The system of claim 17 wherein the processor performs a processing function by performing a feature learning process on a fractional portion of the image proximate the aiming pattern to identify object features and storing learned features for subsequent object inspection.

19. The system of claim 17 wherein the aiming pattern defines an area on the object and the processor performs the feature learning process on a fractional portion by performing the process on the portion of the image within the area defined by the aiming pattern.

20. The system of claim 17 wherein the processor further stores information related to the location of the aiming pattern in the obtained image for use during analysis of subsequently obtained images of other objects.

21. The system of claim 17 wherein the light source is a handheld light source.

22. The system of claim 17 wherein the light source is a laser beam light source.

23. The system of claim 17 wherein the light source is controllable to generate any of a plurality of different aiming patterns, the processor programmed to, after identifying the location of the aiming pattern in the obtained image, identifying the type of aiming pattern in the obtained image and identifying a specific processing function to be performed as a function of the type of aiming pattern identified.

24. The system of claim 17 wherein the processor performs a processing function by searching a portion of the image proximate the aiming pattern for features of interest.

25. A method for use with a camera that includes a field of view (FOV), the method for selecting points within the field of view for analysis, the method comprising the step of:
   (a) placing at least a portion of a first object within the field of view of the camera;
   (b) directing a light source toward the first object within the field of view of the camera so that the light forms an aiming pattern on the object at a first location of interest;
   (c) obtaining a first image of the portion of the first object within the field of view wherein the first image includes the aiming pattern at the first location of interest;
   (d) identifying the location of the aiming pattern in the first image;
   (e) with the first object still within the field of view of the camera, directing the light source toward the first object within the field of view of the camera so that the light forms an aiming pattern on the object at a second location of interest;
   (f) obtaining a second image of the portion of the first object within the field of view wherein the second image includes the aiming pattern at the second location of interest;
   (g) identifying the location of the aiming pattern in the second image; and
   (h) using the identified locations of the aiming pattern in the first and second images to perform a processing function.

26. The method of claim 25 wherein the camera has a video mode and wherein the first and second images are obtained in rapid succession, the method further including the steps of, prior to using the identified locations of the aiming patterns to perform a processing function, directing the light source toward the first object in the field of view so that the aiming pattern is formed on the object at additional locations of interest, obtaining a plurality of additional images of the portion of the first object in the field of view with the aiming pattern at the additional locations of interest and identifying the locations of the aiming pattern in each of the obtained images, the step of using the identified locations including using at least a subset of the identified locations from all of the obtained images.

27. The method of claim 25 wherein the light source is separate from the camera and wherein the light source can be positioned separately from the camera so that the aiming pattern can be aimed at different locations within the field of view of the camera.

28. A method for use with a camera that includes a field of view (FOV), the method for selecting a function to be performed on an image obtained by the camera and comprising the steps of:
   (a) forming any one of a plurality of different illumination aiming patterns on at least one surface of an object within the field of view of the camera;
   (b) obtaining an image of the first object within the field of view wherein the aiming pattern appears in the obtained image;
   (c) examining the obtained image to identify the aiming pattern in the obtained image;
   (d) examining the aiming pattern from the obtained image to determine the type of the identified aiming pattern; and
   (e) identifying a process associated with the identified type of aiming pattern wherein a different process is associated with each different type of aiming pattern.

29. The method of claim 28 further including the step of performing the identified process that is associated with the identified aiming pattern.

30. The method of claim 29 wherein a different process is associated with each of the different aiming patterns and wherein each of the processes is an inspection process.

31. The method of claim 28 further including the steps of providing a light source controllable to generate any of a plurality of different aiming patterns, selecting the one of the plurality of different aiming patterns to be generated by the light source and directing the selected aiming pattern toward the first object within the field of view of the camera so that the light forms the aiming pattern.

32. The method of claim 28 wherein the step of obtaining an image and the step of using a light source include using a light source that is separate from the imager used to obtain the image.

33. The method of claim 28 further including identifying the location of the aiming pattern in the obtained image and performing the identified process on a portion of the image associated with the location of the aiming pattern in the image.

34. A method for use with a camera that includes a field of view (FOV), the method for selecting a function to be performed on an image obtained by the camera and comprising the steps of:
   (a) forming any one of a plurality of different illumination aiming patterns on at least one surface of an object within the field of view of the camera wherein the plurality of aiming patterns include at least first and second different types of aiming patterns;
   (b) obtaining an image of the first object within the field of view wherein the aiming pattern appears in the obtained image;
   (c) examining the obtained image to identify the aiming pattern in the obtained image;
   (d) examining the aiming pattern from the obtained image to determine the type of the identified aiming pattern
   (e) where the aiming pattern in the obtained image is of a first type, identifying a first process; and
   (f) where the aiming pattern in the obtained image is of a second type, identifying a second process that is different than the first process.

35. The method of claim 34 further including the step of performing at least one of the identified first and second processes.

36. The method of claim 34 wherein each of the first and second processes is an inspection process.

* * * * *